(12) United States Patent
Kobayashi et al.

(10) Patent No.: US 7,887,914 B2
(45) Date of Patent: Feb. 15, 2011

(54) PRESSURE-SENSITIVE ADHESIVE COMPOSITIONS, PRESSURE-SENSITIVE ADHESIVE SHEETS AND SURFACE PROTECTING FILMS

(75) Inventors: Natsuki Kobayashi, Ibaraki (JP);
Tatsumi Amano, Ibaraki (JP);
Masahiko Ando, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 941 days.

(21) Appl. No.: 11/227,829

(22) Filed: Sep. 15, 2005

(65) Prior Publication Data

US 2006/0057368 A1 Mar. 16, 2006

(30) Foreign Application Priority Data

Sep. 16, 2004 (JP) .............................. 2004-270188
Mar. 17, 2005 (JP) .............................. 2005-076890

(51) Int. Cl.
*B32B 7/12* (2006.01)
*B32B 27/30* (2006.01)

(52) U.S. Cl. ...................... 428/355 AC; 428/355 EN; 526/931; 156/332

(58) Field of Classification Search ................ 526/931; 428/355 R, 355 AC, 355 EN; 156/332
See application file for complete search history.

(56) References Cited

U.S. PATENT DOCUMENTS

| | | | |
|---|---|---|---|
| 4,312,916 A * | 1/1982 | Kakumaru et al. | 428/345 |
| 4,668,730 A * | 5/1987 | Iovine et al. | 524/460 |
| 5,147,925 A | 9/1992 | Pears et al. | |
| 5,378,405 A * | 1/1995 | Gutman et al. | 252/500 |
| 5,433,892 A | 7/1995 | Czech | |
| 5,508,107 A | 4/1996 | Gutman et al. | |
| 5,591,820 A | 1/1997 | Kydonieus et al. | |
| 5,631,079 A | 5/1997 | Gutman et al. | |
| 5,635,564 A | 6/1997 | Wieditz et al. | |
| 5,885,708 A * | 3/1999 | Lu et al. | 428/353 |
| 5,952,389 A | 9/1999 | Fogel | |
| 5,952,398 A | 9/1999 | Dietz et al. | |
| 5,985,990 A | 11/1999 | Kantner et al. | |
| 6,548,605 B1 | 4/2003 | Morita et al. | |
| 6,562,428 B1 | 5/2003 | Ohrui et al. | |
| 6,783,850 B2 | 8/2004 | Takizawa et al. | |
| 7,026,035 B2 * | 4/2006 | Yano et al. | 428/141 |
| 2002/0183442 A1 | 12/2002 | Wamprecht et al. | |
| 2003/0091818 A1 | 5/2003 | Bamba et al. | |
| 2004/0151903 A1 | 8/2004 | Niino et al. | |
| 2004/0189907 A1 | 9/2004 | Tominaga et al. | |
| 2005/0244633 A1 | 11/2005 | Kobayashi et al. | |
| 2005/0256251 A1 | 11/2005 | Amano et al. | |
| 2006/0045990 A1 | 3/2006 | Kim et al. | |
| 2006/0057371 A1 | 3/2006 | Kobayashi et al. | |
| 2008/0311395 A1 | 12/2008 | Ukei et al. | |

FOREIGN PATENT DOCUMENTS

| | | |
|---|---|---|
| CN | 1517418 | 8/2004 |
| EP | 0 435 080 | 7/1991 |
| EP | 0 961 792 | 6/2002 |
| EP | 1 591 506 A1 | 11/2005 |
| EP | 1 595 929 | 11/2005 |
| EP | 1 602 698 | 12/2005 |
| JP | 58-7470 | 1/1983 |
| JP | 2-080030 | 3/1990 |
| JP | 3-122165 | 5/1991 |
| JP | 5-9449 | 1/1993 |
| JP | 6-65551 | 3/1994 |
| JP | 6-100655 | 4/1994 |
| JP | 6-128539 | 5/1994 |
| JP | 7-104125 | 4/1995 |
| JP | 7-157741 | 6/1995 |
| JP | 7-310066 | 11/1995 |
| JP | 8-104857 | 4/1996 |
| JP | 8-155040 | 6/1996 |
| JP | 9-59581 | 3/1997 |
| JP | 9-87354 | 3/1997 |
| JP | 9-165460 | 6/1997 |

(Continued)

OTHER PUBLICATIONS

Shin-Nakamura Chemical Co., Ltd, "Product Name: NK ESTER AM-90G", Jun. 2001, (Searching Date: May 28, 2008), URL:http://www.shin-nakamura.com/monoma/AM-90G.htm.
Notice of Information Offer Form submitted on Jun. 16, 2008 issued on the corresponding Japanese Patent Application No. 2005-076890, dated Jul. 22, 2008.
File History of the related U.S. Appl. No. 11/117,114, for the period of Aug. 13, 2008-Sep. 26, 2008.
File History of the related U.S. Appl. No. 11/128,489, for the period of Aug. 13, 2008-Sep. 26, 2008.

(Continued)

*Primary Examiner*—Thao T. Tran
(74) *Attorney, Agent, or Firm*—Knobbe Martens Olson & Bear LLP

(57) ABSTRACT

An object of the present invention is to provide a pressure-sensitive adhesive composition which is excellent in antistatic property of a non-electrification-prevented adherend (a subject to be protected) upon peeling, and has reduced stainability in an adherend and is excellent in adhesion reliance, and electrification preventing pressure-sensitive adhesive sheets and surface protecting films using the same. There is provided a pressure-sensitive adhesive composition, which comprises a (meth)acryl-based polymer containing, as a monomer component, 5 to 100% by weight of a (meth)acrylic acid alkylene oxide adduct, 0 to 95% by weight of a (meth) acryl-based monomer having an alkyl group of a carbon number of 1 to 14 other than the adduct, and 0 to 95% by weight of other polymerizable monomer, and an alkali metal salt, wherein an acid value of the (meth)acryl-based polymer is 10 or lower.

27 Claims, 1 Drawing Sheet

FOREIGN PATENT DOCUMENTS

| | | |
|---|---|---|
| JP | 11-256116 | 9/1999 |
| JP | 2980874 | 9/1999 |
| JP | 2000-44912 | 2/2000 |
| JP | 2000-129235 | 5/2000 |
| JP | 2000-273417 | 10/2000 |
| JP | 2001-49205 | 2/2001 |
| JP | 2001-146581 | 5/2001 |
| JP | 2001-220474 | 8/2001 |
| JP | 2001-512508 | 8/2001 |
| JP | 2001-305346 | 10/2001 |
| JP | 2001-316643 | 11/2001 |
| JP | 2002-019039 | 1/2002 |
| JP | 2002-293870 | 10/2002 |
| JP | 2003-41205 | 2/2003 |
| JP | 2003-147325 | 5/2003 |
| JP | 2004-287199 A | 10/2004 |
| JP | 2005-200607 | 7/2005 |
| JP | 2005-206776 | 8/2005 |
| JP | 2007-536427 | 12/2007 |
| WO | WO 98/36005 | 8/1998 |
| WO | WO 00/24839 | 5/2000 |
| WO | WO 03/011958 | 2/2003 |

OTHER PUBLICATIONS

File History of the related U.S. Appl. No. 12/065,653, for the period of Aug. 13, 2008-Sep. 26, 2008.
File History of the related U.S. Appl. No. 11/117,114, for the period of Sep. 26, 2008-Feb. 3, 2009.
File History of the related U.S. Appl. No. 11/128,489, for the period of Sep. 26, 2008-Feb. 3, 2009.
File History of the related U.S. Appl. No. 11/226,956, for the period of Aug. 12, 2008-Feb. 3, 2009.
File History of the related U.S. Appl. No. 12/065,653, for the period of Sep. 26, 2008-Feb. 3, 2009.
Chinese Office Action issued on the corresponding Chinese Patent Application No. 200510104046.9, dated May 22, 2009.
Fujimoto, T., *Shin Kaimenkasseizai Nyuumon*, 1996, p. 277.
File History of the related U.S. Appl. No. 11/117,114, for the period of Feb. 4, 2009-Sep. 30, 2009.
File History of the related U.S. Appl. No. 11/128,489, for the period of Feb. 4, 2009-Sep. 30, 2009.
File History of the related U.S. Appl. No. 11/226,956, for the period of Feb. 4, 2009-Sep. 30, 2009.
File History of the related U.S. Appl. No. 12/065,653, for the period of Feb. 4, 2009-Sep. 30, 2009.
Information Offer Form submitted in the corresponding Japanese Patent Application No. 2005-076890, dated Dec. 17, 2007.
Notice of Information Offer Form issued in the corresponding Japanese Patent Application No. 2005-076890, dated Jan. 24, 2008.
Database WPI, Section Ch, Week 199423, Derwent Publications Ltd., London, GB: Class A14, AN 1994-189173, XP002343566.
European Search Report issued on the corresponding/related European Patent Application No. 05009331, dated Jul. 22, 2005.
European Search Report issued on the related European Patent Application No. 05010330, dated Sep. 19, 2005.
European Search Report issued on the related European Patent Application No. 05020138, dated Nov. 28, 2005.
European Search Report issued on the corresponding European Patent Application No. 05020102, dated Nov. 29, 2005.
Information Offer Form submitted in the related Japanese Patent Application No. 2004-135167, dated Oct. 30, 2007.
International Search Report issued on the related PCT Application No. PCT/JP2006/317458, dated Nov. 28, 2006.
Notice of Information Offer Form issued on the related Japanese Patent Application No. 2004-135167, dated Dec. 11, 2007.
File History of the related U.S. Appl. No. 11/117,114, as of Aug. 12, 2008.
File History of the related U.S. Appl. No. 11/128,489, as of Aug. 12, 2008.
File History of the related U.S. Appl. No. 11/226,956, as of Aug. 12, 2008.
File History of the related U.S. Appl. No. 12/065,653, as of Aug. 12, 2008.
"Adhesive Hand Book, the first edition", edited by Japan Adhesive Tape Manufactures Association, Adhesive Hand Book Editorial Committee, Mar. 2, 1985, the front page, the contents page, p. 79 and the colophon, Partial Translation (p. 79 only).
Information Offer Form submitted in the corresponding Japanese Patent Application No. 2005-076890, dated Feb. 5, 2010.
File History of the related U.S. Appl. No. 11/117,114, for the period of Oct. 1, 2009-Mar. 12, 2010.
File History of the related U.S. Appl. No. 11/128,489, for the period of Oct. 1, 2009-Mar. 12, 2010.
File History of the related U.S. Appl. No. 11/226,956, for the period of Oct. 1, 2009-Mar. 12, 2010.
File History of the related U.S. Appl. No. 11/117,114, for the period of Mar. 13, 2010-May 3, 2010.
File History of the related U.S. Appl. No. 11/128,489, for the period of Mar. 13, 2010-May 3, 2010.
File History of the related U.S. Appl. No. 11/226,956, for the period of Mar. 13, 2010-May 3, 2010.
File History of the related U.S. Appl. No. 12/065,653, for the period of Oct. 1, 2009-May 3, 2010.
"Electrical Properties of Polymers" edited by Yasaku Wada, published by Shokabo Publishing Co., Ltd, Aug. 15, 1987, Partial Translation.
File History of the related U.S. Appl. No. 11/117,114, for the period of May 4, 2010-Dec. 8, 2010.
File History of the related U.S. Appl. No. 11/128,489, for the period of May 4, 2010-Dec. 8, 2010.
File History of the related U.S. Appl. No. 11/226,956, for the period of May 4, 2010-Dec. 8, 2010.
File History of the related U.S. Appl. No. 12/065,653, for the period of May 4, 2010-Dec. 8, 2010.

\* cited by examiner

PRESSURE-SENSITIVE ADHESIVE COMPOSITIONS, PRESSURE-SENSITIVE ADHESIVE SHEETS AND SURFACE PROTECTING FILMS

BACKGROUND OF THE INVENTION

1. Field of the Invention

The present invention relates to an acryl-based pressure-sensitive adhesive composition. More particularly, the present invention relates to antistatic pressure-sensitive adhesive compositions, and pressure-sensitive adhesive sheets and surface protecting films using the same.

Pressure-sensitive sheets comprising an antistatic pressure-sensitive adhesive composition of the present invention is suitably used in plastic products on which static electricity is easily generated. Among them, particularly, pressure-sensitive adhesive sheets of the present invention are useful as a surface protecting film (a protecting film) used for the purpose of protecting a surface of an optical member such as a polarizing plate, a wavelength plate, a retardation plate, an optical compensating film, a reflecting sheet, and a luminance improving film which are used as a liquid crystal display or the like.

2. Description of the Related Art

In recent years, upon transportation of optical appliances or electronic appliances and packaging of those parts on a printed board, individual parts are frequently transferred in the state where they are wrapped with a prescribed sheet, or in the state where they are applied to a pressure-sensitive adhesive tape. Among them, a surface protecting film is particularly widely used in the field of optical-electronic parts.

A surface protecting film is generally used for the purpose of preventing a scratch or a stain produced at processing or conveyance of a subject to be protected by applying to a subject to be protected via a pressure-sensitive adhesive layer coated on a protecting film side. For example, for the purpose of preventing a scratch or a stain, a surface protecting film is applied to an optical member such as a polarizing plate and a wavelength plate used in a panel of a liquid crystal display via a pressure-sensitive adhesive layer. When a liquid crystal display is produced with these optical members, since a surface protecting film become unnecessary, it is peeled and removed from an optical member.

In general, since the aforementioned optical member, pressure-sensitive adhesive, and surface protecting film are constructed of a plastic material, they have high electrical insulating property and generate static electricity upon friction or peeling. Therefore, also when a protecting film is peeled from an optical member such as a polarizing plate, static electricity is generated. When a voltage is applied to a liquid crystal in the state where static electricity remains, orientation of a liquid crystal molecule is lost, and a defect of a panel is generated.

In addition, static electricity is a great problem in a step of manufacturing a liquid crystal display or a touch panel. Due to this static electricity, there arises a problem that a dust is attached to a surface protecting film or an optical member, and this pollutes an optical member. Then, in order to prevent such the disadvantage, a surface protecting film is subjected to various antistatic treatments.

Previously, as an attempt to suppress the aforementioned electrification of static electricity, for example, a method of preventing electrification by adding a low-molecular surfactant to a pressure-sensitive adhesive, and transferring a surfactant from a pressure-sensitive adhesive to an adherend has been disclosed (for example, see Patent Publication 1). However, the low-molecular surfactant is easily bled on a surface of a pressure-sensitive adhesive layer and, when applied to a surface protecting film, staining of an adherend (a subject to be protected) is feared. Therefore, when a pressure-sensitive adhesive with a low-molecular surfactant added thereto is applied to a surface protecting film, there is a problem that optical property of an optical member is deteriorated.

In addition, pressure-sensitive adhesive sheets in which an antistatic agent is contained in a pressure-sensitive adhesive layer (for example, see Patent Publication 2) are disclosed. For preventing bleeding of an antistatic agent onto the surface of a pressure-sensitive adhesive in such pressure-sensitive adhesive sheets, an antistatic agent comprising a polyether polyol compound and an alkali metal salt is added to an acryl-based pressure-sensitive adhesive. However, even if such pressure-sensitive adhesive sheets is used, the bleeding of the antistatic agent etc. is inevitable, and as a result, there is a problem that upon actual application to a surface protecting film, there occurs a phenomenon wherein due to the bleeding with time or upon treatment under high temperature conditions, the surface protecting film is partially peeled off from the subject to be protected.

As described above, in any of these, the aforementioned problems can not be solved well-balanced yet and, in the technical field associated with electronic appliances where electrification or staining becomes a particularly serious problem, it is difficult to correspond to demand of further improvement of an antistatic surface protecting film.

[Patent Publication 1] JP-A No. 9-165460
[Patent Publication 2] JP-A No. 6-128539

SUMMARY OF THE INVENTION

In light of such the circumstances, an object of the present invention is to solve problems to provide an antistatic pressure-sensitive adhesive composition which is excellent in antistatic property of a non-electrification-prevented adherend (a subject to be protected) upon peeling, and has reduced stainability in an adherend and is excellent in adhesion reliance, and electrification preventing pressure-sensitive adhesive sheets and surface protecting films using the same.

SUMMARY OF THE INVENTION

In order to solve the aforementioned problems, the present inventors intensively studied and, as a result, found out that the aforementioned object can be attained by a pressure-sensitive adhesive composition shown below, which resulted in completion of the present invention.

That is, a pressure-sensitive adhesive composition of the present invention is a pressure-sensitive adhesive composition, which comprises a (meth)acryl-based polymer containing, as a monomer component, 5 to 100% by weight of a (meth)acrylic acid alkylene oxide adduct, 0 to 95% by weight of a (meth)acryl-based monomer having an alkyl group of a carbon number of 1 to 14 other than the adduct, and 0 to 95% by weight of other polymerizable monomer, and an alkali metal salt, wherein an acid value of the (meth)acryl-based polymer is 10 or lower.

The (meth)acryl-based polymer in the present invention refers to an acryl-based polymer and/or a methacryl-based polymer. And the (meth)acryl-based monomer in the present invention refers to an acryl-based monomer and/or a methacryl-based monomer. Also, the (meth)acrylate in the present invention refers to an acrylate and/or a methacrylate.

According to the pressure-sensitive adhesive composition of the present invention, as shown in results of Examples, by using a pressure-sensitive adhesive composition comprising a (meth)acryl-based polymer containing, as a main component, 5 to 100% by weight of a (meth)acrylic acid alkylene oxide adduct and having an acid value of 10 or lower, and an alkali metal salt, in a pressure-sensitive adhesive layer obtained by crosslinking this, electrification on an adherend (a subject to be protected) which has not been electrification-prevented is prevented upon peeling, and staining on an adherend (a subject to be protected) is reduced. Although details of reasons why a crosslinked base polymer using the aforementioned monomer component as a main component manifests such the property are not clear, it is presumed that, by coordination of an ether group in an acrylic acid alkylene oxide adduct with an alkali metal salt, bleeding of an alkali metal salt becomes difficult, and both of excellent antistatic property and low staining property are realized.

The pressure-sensitive adhesive composition in the present invention is characterized in that a (meth)acryl-based polymer having an acid value of 10 or lower is used. An acid value of a (meth)acryl-based polymer in the present invention refers to an mg number of potassium hydroxide necessary for neutralizing a free fatty acid and a resin acid contained in 1 g of a sample. It is presumed that, by the presence of many carboxyl groups and sulfonate groups having great interaction with an alkali metal salt in a (meth)acryl-based polymer skeleton, ion conduction is prevented, and excellent ability of preventing electrification on an adherend (a subject to be protected) is not obtained. In a (meth)acryl-based polymer having an acid value exceeding 10, excellent ability of preventing electrification on an adherend (a subject to be protected) is not obtained in some cases.

In addition, the present invention is characterized in that an alkali metal salt is contained. By using an alkali metal salt to obtain affinity and well-balanced interaction with a (meth)acryl-based polymer, the pressure-sensitive adhesive composition which prevents electrification on an adherend (a subject to be protected) which has not been electrification-prevented upon peeling and which reduces staining on an adherend (a subject to be protected) can be obtained.

Examples of an alkali metal salt which is used in the foregoing include a metal salt comprising lithium, sodium, or potassium and, among them, a lithium salt having high dissociating property is preferable.

On the other hand, a pressure-sensitive adhesive layer in the present invention is characterized in that it is formed by crosslinking the pressure-sensitive adhesive composition described above. According to the pressure-sensitive adhesive layer of the present invention, since a pressure-sensitive adhesive composition exerting the aforementioned action and effect is crosslinked to form the layer, staining property on an adherend (a subject to be protected) is reduced, and a pressure-sensitive adhesive layer excellent in antistatic property of pressure-sensitive adhesive sheets upon peeling is obtained. In addition, by appropriately regulating a constituent unit and a constituent ratio of a (meth)acryl-based polymer, selection of a crosslinking agent, and an addition ratio, and crosslinking a pressure-sensitive adhesive composition, pressure-sensitive adhesive sheets more excellent in heat resistance can be obtained.

In addition, a pressure-sensitive adhesive sheet of the present invention is characterized in that the film has a pressure-sensitive adhesive layer, which is formed by crosslinking a pressure-sensitive adhesive composition as defined above on one side or both sides of a support (a support film). According to the pressure-sensitive adhesive sheet of the present invention, since the pressure-sensitive adhesive composition of the present invention exerting the aforementioned action and effect is used, electrification of a pressure-sensitive adhesive sheet can be prevented upon peeling, and a pressure-sensitive adhesive sheet which can reduce staining property on an adherend (a subject to be protected) can be obtained. For this reason, in particular, those sheets are very useful as an antistatic pressure-sensitive adhesive sheet in the technical field associated with an electron appliances in which electrification of static electricity and staining are a particularly serious problem.

Furthermore, a surface protecting film of the present invention is characterized in that the film has a pressure-sensitive adhesive layer, which is formed by crosslinking a pressure-sensitive adhesive composition as defined above on one side or both sides of a support (a support film). According to the surface protecting film of the present invention, since the pressure-sensitive adhesive composition of the present invention exerting the aforementioned action and effect is used, electrification of a pressure-sensitive adhesive film can be prevented upon peeling, and a surface protecting film which can reduce staining property on an adherend (a subject to be protected) can be obtained. For this reason, in particular, those films are very useful as an antistatic pressure-sensitive adhesive film in the technical field associated with an electron appliances in which electrification of static electricity and staining are a particularly serious problem.

BEST MODE FOR CARRYING OUT THE INVENTION

Figure 1:
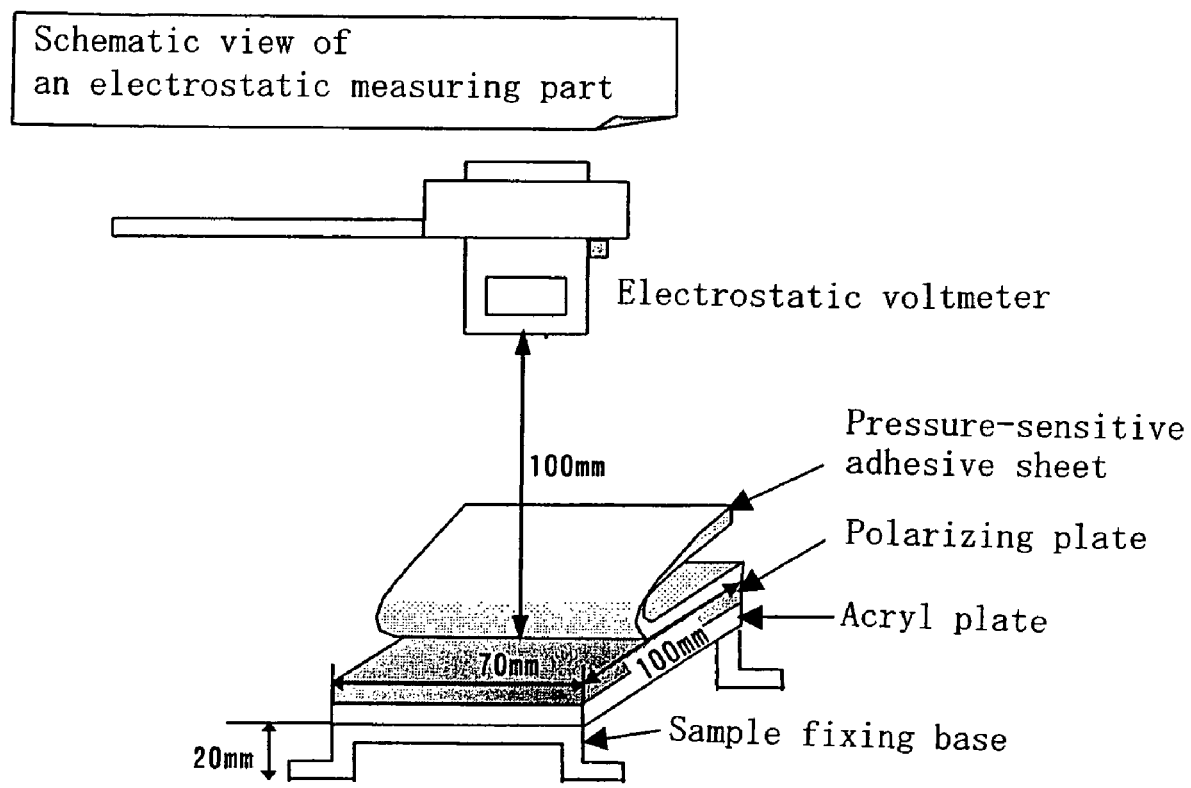
FIG. 1 is a schematic construction view of an electrostatic measuring part used for measuring a peeling electrification voltage in Examples.

Embodiments of the present invention will be explained in detail below.

A pressure-sensitive adhesive composition of the present invention is a pressure-sensitive adhesive composition, which comprises a (meth)acryl-based polymer containing, as a monomer component, 5 to 100% by weight of a (meth)acrylic acid alkylene oxide adduct, 0 to 95% by weight of a (meth)acryl-based monomer having an alkyl group of a carbon number of 1 to 14 other than the adduct, and 0 to 95% by weight of other polymerizable monomer, and an alkali metal salt, wherein an acid value of the (meth)acryl-based polymer is 10 or lower.

A (meth)acryl-based polymer used in the present invention is not particularly limited as far as it is a (meth)acryl-based polymer having pressure-sensitive adhering property corresponding to the aforementioned property.

Examples of an oxyalkylene unit of a (meth)acrylic acid alkylene oxide adduct in the present invention include an alkylene group of a carbon number of 1 to 6 such as an oxymethylene group, an oxyethylene group, an oxypropylene group, and an oxybutylene group.

In addition, a mole number of addition of an oxyalkylene unit to (meth)acrylic acid is preferably 1 to 30, more preferably 1 to 20 from a viewpoint of affinity with an alkali metal salt. An end of an oxyalkylene chain may remain a hydroxyl group, or may be substituting with other functional group, and is preferably substituted with an alkyl group, a phenyl group or the like for appropriately controlling a crosslinking density.

Examples of a (meth)acrylic acid alkylene oxide adduct in the present invention include methoxy-polyethylene glycol (meth)acrylate type such as methoxy-diethylene glycol (meth)acrylate, and methoxy-triethylene glycol(meth)acrylate, ethoxy-polyethylene glycol(meth)acrylate type such as ethoxy-diethylene glycol(meth)acrylate, and ethoxy-triethylene glycol(meth)acrylate, butoxy-polyethylene glycol(meth)acrylate type such as butoxy-diethylene glycol(meth)acrylate, and butoxy-triethylene glycol(meth)acrylate, phenoxy-polyethylene glycol(meth)acrylate type such as phenoxy-diethylene glycol(meth)acrylate, and phenoxy-triethylene glycol(meth)acrylate, and methoxy-polypropylene glycol (meth)acrylate type such as methoxy-dipropylene glycol (meth)acrylate. Among them, ethoxy-diethylene glycol acrylate is preferably used.

(Meth)acrylic acid alkylene oxide adducts may be used alone, or two or more kinds may be used by mixing, and a content as a whole is preferably 5 to 100% by weight, more preferably 7 to 90% by weight, particularly preferably 9 to 80% by weight in a monomer component of a (meth)acryl-based polymer. When a content of a (meth)acrylic acid alkylene oxide adduct is less than 5% by weight, interaction with an alkali metal salt becomes insufficient, and effect of suppressing bleeding of an alkali metal salt and effect of reducing staining of an adherend (a subject to be protected) are not sufficiently obtained, which is not preferable.

In addition, in the present invention, a (meth)acryl-based monomer having an alkyl group of a carbon number of 1 to 14 can be used, and it is more preferable to use a (meth)acryl-based monomer having an alkyl group of a carbon number of 2 to 13. Examples of (meth)acrylate having an alkyl group of a carbon number of 1 to 14 include methyl(meth)acrylate, ethyl(meth)acrylate, n-butyl(meth)acrylate, s-butyl(meth)acrylate, t-butyl(meth)acrylate, isobutyl(meth)acrylate, hexyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, n-tridecyl(meth)acrylate, and n-tetradecyl(meth)acrylate. Among them, n-butyl(meth)acrylate, and 2-ethylhexyl(meth)acrylate or the like are preferable to use for the present invention.

In the present invention, (meth)acryl-based monomers having an alkyl group of a carbon number of 1 to 14 may be used alone, or two or more kinds may be used by mixing, and a content as a whole is preferably 0 to 95% by weight, more preferably 10 to 93% by weight, particularly preferably 20 to 91% by weight in a monomer component of a (meth)acryl-based polymer. By using a (meth)acryl-based monomer having an alkyl group of a carbon number of 1 to 14, better interaction with an alkali metal salt, and better adherability can be appropriately regulated.

As other polymerizable monomer other than a (meth)acryl-based monomer having an alkyl group of a carbon number of 1 to 14, a polymerizable monomer for regulating a glass transition point or peelability of a (meth)acryl-based polymer can be used in such a range that the effect of the present invention is not deteriorated.

As other polymerizable monomer which is used in a (meth)acryl-based polymer, components other than (meth)acrylate having a carboxyl group, a sulfonate group, a phosphoric acid group, or an acid anhydride group can be used without any limitation. Among them, in particular, since control of crosslinking can be easily conducted, (meth)acrylate having a hydroxyl group are more preferably used.

In the present invention, an acid value of the (meth)acryl-based polymer is preferably 10 or less, more preferably 8 or less, further preferably 6 or less.

Specifically, an acid value can be adjusted by an amount of (meth)acrylate having an acid functional group to be blended, and examples thereof include a (meth)acryl-based polymer obtained by copolymerizing 2-ethylhexyl acrylate as a (meth)acryl-based polymer having a carboxyl group, and acrylic acid. In this case, by adjusting acrylic acid at 1.3 parts by weight relative to a total of 100 parts by weight of 2-ethylhexyl acrylate and acrylic acid, the aforementioned acid value can be satisfied.

In the present invention, the hydroxyl group-containing monomer can be optionally used. Examples of the hydroxyl group-containing monomer include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutylvinyl ether, and diethylene glycol monovinyl ether.

In the case where the aforementioned (meth)acryl-based monomer having a hydroxyl group is contained, a (meth)acryl-based monomer having a hydroxyl group is preferably 0.1 to 10 parts by weight, more preferably 0.5 to 8 parts by weight relative to 100 parts by weight of a whole constituent unit of a (meth)acryl-based polymer.

Furthermore, in the present invention, as an arbitrary component other than the aforementioned monomers, for example, as other polymerizable monomer component, a cohesive strength or a heat resistance improving component such as a sulfonic acid group-containing monomer, a phosphoric acid group-containing monomer, a cyano group-containing monomer, vinyl esters, and an aromatic vinyl compound, and a component having a functional group working for improving an adhesive strength or for a crosslinking point, such as an amido group-containing monomer, an amino group-containing monomer, an imido group-containing monomer, an epoxy group-containing monomer, (meth)acryloylmorpholine, vinyl ethers can be appropriately used. Other components may be used alone, or two or more of them may be used by mixing.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the amido group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetoneacrylamide.

Examples of the amino group-containing monomer include aminoethyl(meth)acrylate, N,N-dimethylaminoethyl(meth)acrylate, and N,N-dimethylaminopropyl(meth)acrylate.

Examples of the imido group-containing monomer include cyclohexylmaleimide, isopropylmaleimide, N-cyclohexylmaleimide, and itaconeimide.

Examples of the epoxy group-containing monomer include glycidyl(meth)acrylate, methylglycidyl(meth)acrylate, and allyl glycidyl ether.

Examples of vinyl ethers include methyl vinyl ether, ethyl vinyl ether, and isobutyl vinyl ether.

The aforementioned other polymerizable monomer component may be used alone, or two or more kinds may be used by mixing, and a content as a whole is such that a polymerizable monomer component is preferably 0 to 95 parts by weight, more preferably 10 to 93 parts by weight, particularly preferably 20 to 91 parts by weight relative to 100 parts by weight of a total constituting unit of a (meth)acryl-based polymer. By using the aforementioned other polymerizable monomer component, better interaction with an alkali metal salt, and better adherability can be appropriately regulated.

The aforementioned (meth)acryl-based polymer used in the present invention has a weight average molecular weight of preferably 100,000 to 5,000,000, more preferably 200,000 to 4,000,000, further preferably 300,000 to 3,000,000. When a weight average molecular weight is less than 100,000, there is a tendency that paste (adhesive residue) remaining is generated due to reduction in a cohesive strength of a pressure-sensitive adhesive composition. On the other hand, when a weight average molecular weight exceeds 5,000,000, there is a tendency that fluidity of a polymer is reduced, wetting on a polarizing plate becomes insufficient. A weight average molecular weight is obtained by measurement with GPC (gel permeation chromatography).

In addition, for the reason that pressure-sensitive adhering performance is easily balanced, it is desirable that a glass transition temperature (Tg) of the (meth)acryl-based polymer is 0° C. or lower (usually −100° C. or higher), preferably −10° C. or lower. When a glass transition temperature is higher than 0° C., it becomes difficult to obtain a sufficient adhering property. In addition, a glass transition temperature (Tg) of a (meth)acryl-based polymer can be adjusted in the aforementioned range by appropriating changing a monomer component and a composition ratio to be used.

The (meth)acryl-based polymer of the present invention is obtained by a polymerization method which is generally used as a procedure for synthesizing a (meth)acryl-based polymer such as solution polymerization, emulsion polymerization, bulk polymerization, and suspension polymerization. In addition, the resulting polymer may be any of a random copolymer, a block copolymer, and a graft copolymer.

Examples of an alkali metal salt used in the present invention include a metal salt comprising lithium, sodium, or potassium, and, specifically, a metal salt constructed of a cation consisting of $Li^+$, $Na^+$, or $K^+$, and an anion consisting of $Cl^-$, $Br^-$, $I^-$, $BF_4^-$, $PF_6^-$, $SCN^-$, $ClO_4^-$, $CF_3SO_3^-$, $(CF_3SO_2)_2N^-$, $(C_2F_5SO_2)_2N^-$, or $(CF_3SO_2)_3C^-$ is preferably used. Among them, a lithium salt such as LiBr, LiI, LiBF4, $LiPF_6$, LiSCN, $LiClO_4$, $LiCF_3SO_3$, $Li(CF_3SO_2)_2N$, $Li(C_2F_5SO_2)_2N$, and $Li(CF_3SO_2)_3C$ is preferably used. These alkali metal salts may be used alone, or two or more kinds may be used by mixing.

Regarding a blending amount of an alkali metal salt used in the pressure-sensitive adhesive composition, an alkali metal salt is preferably blended at an amount of 0.01 to 5 parts by weight, more preferably by weight relative to 100 parts by weight of a (meth)acryl-based polymer, further preferably 0.05 to 3 parts by weight relative to 100 parts by weight of a (meth)acryl-based polymer. When a blending amount is less than 0.01 part by weight, sufficient antistatic property is not obtained in some cases. On the other hand, when a blending amount is more than 5 parts by weight, there is a tendency that staining on an adherend (a subject to be protected) is increased, which is not preferable.

In the pressure-sensitive adhesive composition of the present invention, pressure-sensitive adhesive sheets further excellent in heat resistance are obtained by appropriately crosslinking a (meth)acryl-based polymer. Examples of a specific means for a crosslinking compounds include a crosslinking agent, in which a compound having a group reactive with a carboxyl group, a hydroxyl group which is appropriately contained as a crosslinking basal point in a (meth)acryl-based polymer such as an isocyanate compound, an epoxy compound, a melanine-based resin and an aziridine compound is added to react them. Among them, from a viewpoint mainly of obtaining an appropriate cohesive strength, an isocyanate compound and an epoxy compound are particularly preferably used. These compounds may be used alone, or two or more kinds may be used by mixing.

Examples of the isocyanate compound include lower aliphatic polyisocyanates such as butylene diisocyanate, and hexamethylene diisocyanate, alicyclic isocyanates such as cyclopentylene diisocyanate, cyclohexylene diisocyanate, and isophorone diisocyanate, aromatic diisocyanates such as 2,4-tolylene diisocyanate, 4,4'-diphenylmethane diisocyanate, and xylene diisocyanate, and isocyanate adducts such as trimethylolpropane/tolylene diisocyanate trimer adduct (trade name: Coronate L manufactured by Nippon Polyurethane Industry Co., Ltd.), trimethylolpropane/hexamethylene diisocyanate trimer adduct (trade name: Coronate HL manufactured by Nippon Polyurethane Industry Co., Ltd.), and isocyanurate entity of hexamethylene diisocyanate (trade name: Coronate HX manufactured by Nippon Polyurethane Industry Co., Ltd.). These isocyanate compounds may be used alone, or two or more kinds may be used by mixing.

Examples of the epoxy compound include N,N,N',N'-tetraglycidyl-m-xylenediamine (trade name TETRAD-X manufactured by Mitsubishi Gas Chemical Company, Inc.) and 1,3-bis(N,N-diglycidylaminomethyl)cyclohexane (trade name TETRAD-C manufactured by Mitsubishi Gas Chemical Company Inc.). These compounds may be used alone, or two or more kinds may be used by mixing.

Examples of the melamine-based resin include hexamethylolmelamine. These resins may be used alone, or two or more kinds may be used by mixing.

Examples of the aziridine derivative include trade name HDU, trade name TAZM, and trade name TAZO (all of which are manufactured by Sogo Pharmaceutical Co., Ltd.) as a commercially available product. These compounds may be used alone, or two or more kinds may be used by mixing.

Examples of the metal chelate compound include aluminum, iron, tin, titanium, nickel, and so on as metal components, and acetylene, methyl acetoacetic acid, ethyl lactic acid, and so on, as chelate components. These compounds may be used alone, or two or more kinds may be used by mixing.

An amount of these crosslinking agents to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the crosslinking agent is contained preferably at 0.01 to 15 parts by weight, more preferably 0.5 to 10 parts by weight relative to 100 parts by weight of the (meth)acryl-based polymer. When a content is less than 0.01 part by weight, crosslinking formation due to a crosslinking agent becomes insufficient, a cohesive strength of a pressure-sensitive adhesive composition becomes small, and sufficient heat resistance is not obtained in some cases, and there is a tendency that it becomes cause for an adhesive residue. On the other hand, when a content exceeds 15 parts by weight, a cohesive strength of a polymer is great, fluidity is reduced, and wetting on an adherend (a subject to be protected) becomes insufficient, and there is a tendency that this becomes cause for peeling off. These crosslinking agents may be used alone, or may be used by mixing two or more kinds.

Alternatively, a polyfunctional monomer containing two or more radiation-reactive unsaturated bonds as a substantial crosslinking agent is added, and this may be crosslinked with radiation.

As the polyfunctional monomer having two or more radiation-reactive unsaturated bonds, a polyfunctional monomer component having two or more of one kind or two or more kinds radiation-reactive groups which can be crosslinking-treated (cured) by irradiation of radiation, such as a vinyl group, an acryloyl group, a methacryloyl group, and a vinylbenzyl group is used. Generally, a component having 10 or less of radiation-reactive unsaturated bonds is suitably used. The polyfunctional monomers may be used alone, or two or more kinds may be used by mixing.

Examples of the polyfunctinal monomer include ethylene glycol di(meth)acrylate, diethlene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

An amount of the polyfunctinoal monomer to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the monomer is preferably blended at 0.1 to 30 parts by weight relative to 100 parts by weight of a (meth)acryl-based polymer. From a viewpoint of flexibility and tackiness, the monomer is preferably blended at 10 parts by weight or less relative to 100 parts by weight of a (meth)acryl-based polymer.

Examples of radiation include ultraviolet ray, laser ray, $\alpha$ ray, $\beta$ ray, $\gamma$ ray, X-ray, and electron beam. From a viewpoint of controlling property and better handling property and a cost, ultraviolet ray is suitably used. More preferably, ultraviolet ray having a wavelength of 200 to 400 nm is used. Ultraviolet ray can be irradiated using an appropriate light source such as a high pressure mercury lamp, a micro-wave excitation-type lamp, and a chemical lamp. When ultraviolet ray is used as irradiation, a photopolymerization initiator is added to an acryl pressure-sensitive adhesive layer.

The photopolymerization initiator depends on a kind of a radiation-reactive component, and may be a substance which produces a radical or a cation by irradiating ultraviolet ray having an appropriately wavelength which can trigger the polymerization reaction.

Example of the photoradical polymerization initiator include benzoins such as benzoin, benzoin methyl ether, benzoin ethyl ether, methyl o-benzoylbenzoate-p-benzoin ethyl ether, benzoin isopropyl ether, and $\alpha$-methylbenzoin, acetophenes such as benzyldimethylketal, trichloroacetophenone, 2,2-diethoxyacetophenone, and 1-hydroxycyclohexyl phenyl ketone, propiophenones such as 2-hydroxy-2-methylpropiophenone, and 2-hydroxy-4'-isopropyl-2-methylpropiophenone, benzophenones such as benzophenone, methylbenzophenone, p-chlorobenzophenone, and p-dimethylaminobenzophenone, thioxanthons such as 2-chlorothioxanthon, 2-ethylthioxanthon, and 2-isopropylthioxanthon, acylphosphine oxides such as bis(2,4,6-trimethylbenzoyl)-phenylphosphine oxide, 2,4,6-trimethylbenzoyl-diphenylphosphine oxide, and (2,4,6-trimethylbenzoyl)-(ethoxy)-phenylphosphine oxide, benzil, dibenzsuberone, and $\alpha$-acyloxime ether. These initiators may be used alone, or two or more kinds may be used by mixing.

Examples of a photocation polymerization initiator include onium salts such as an aromatic diazonium salt, an aromatic iodonium salt, and an aromatic sulfonium salt, organometallic complexes such as an ion-allene complex, a titanocene complex, and an aryl silanol-aluminum complex, nitrobenzyl ester, sulfonic acid derivative, phosphoric acid ester, phenolsulfonic acid ester, diazonaphthoquinone, and N-hydroxyimidosulfonate. The photopolymerization initiators may be used alone, or two or more kinds may be used by mixing.

It is preferably that the photopolymerization initiator is blended usually in a range of 0.1 to 10 parts by weight, preferably 0.2 to 7 parts by weight relative to 100 parts by weight of a (meth)acryl-based polymer.

In addition, it is also possible to use a photoinitiation polymerization assistant such as amines. Examples of the photoinitiation assistant include 2-dimethylaminoethyl benzoate, dimethylaminoacetophenone, p-dimethylaminobenzoic acid ethyl ester, and p-dimethylaminobenzoic acid isoamyl ester. Two or more kinds of the photopolymerization initiation assistants may be used. It is preferably that the polymerization initiation assistant is blended at 0.05 to 10 parts by weight, further 0.1 to 7 parts by weight relative to 100 parts by weight a (meth)acryl-based polymer.

A pressure-sensitive adhesive composition of the present invention can properly contain an ether group-containing compound. The containing of the above-mentioned ether group-containing compound in a pressure-sensitive adhesive composition allows the pressure-sensitive adhesive composition to be further excellent in antistatic properties.

An ether group-containing compound in the present invention is not particularly limited if it is a compound having an ether group, and publicly known ether group-containing compounds are used arbitrarily.

Specific examples of the above-mentioned ether group-containing compound include a polyether polyol compound and an alkylene oxide group-containing compound.

Examples of a polyether polyol compound include polyethylene glycol (diol type), polypropylene glycol (diol type), polypropylene glycol (triol type), polytetramethylene ether glycol, and a derivative thereof, and a block copolymer of and a random copolymer of polypropylene glycol/polyethylene glycol such as a polypropylene glycol/polyethylene glycol/polypropylene glycol block copolymer, a polypropylene glycol/polyethylene glycol block copolymer, a polyethylene glycol/polypropylene glycol/polyethylene glycol block copolymer, a polypropylene glycol/polyethylene glycol random copolymer.

A terminal of a glycol chain may be a hydroxyl group or substituted with an alkyl group or a phenyl group.

Examples of an alkylene oxide group-containing compound include polyoxyethylene alkylamine, polyoxypropylene alkylamine, polyoxyethylenediamine, polyoxypropylene diamine, an alkylene oxide group-containing (meth) acryl-based polymer such as an ethylene oxide group-containing acryl-based polymer, an alkylene oxide group-containing polyether-based polymer such as an ethylene oxide group-containing polyether-based polymer, alkylene oxide group-containing polyether ester such as ethylene oxide group-containing polyether ester, alkylene oxide group-containing polyether ester amide such as ethylene oxide group-containing polyether ester amide, alkylene oxide group-containing polyether amide imide such as ethylene oxide group-containing polyether amide imide, polyoxyalkylene glycol fatty ester such as polyoxyethylene glycol fatty ester and polyoxypropylene glycol fatty ester, polyoxysorbitan acid fatty ester, polyoxyalkylene alkylphenyl ether such as polyoxyethylene alkylphenyl ether and polyoxypropylene alkylphenyl ether, polyoxyalkylene alkyl ether such as polyoxyethylene alkyl ether and polyoxypropylene alkyl ether, and polyoxyalkylene alkylallyl ether such as polyoxyethylene alkylallyl ether and polyoxypropylene alkylallyl ether.

Among them, a polyether polyol compound, an alkylene glycol group-containing (meth)acryl-based polymer, and ether-type surfactants such as polyoxyethylene alkylphenyl ether, polyoxypropylene alkylphenyl ether, polyoxyethylene alkyl ether, polyoxypropylene alkyl ether, polyoxyethylene alkylallyl ether, and polyoxypropylene alkylallyl ether are preferably used by reason of well-balanced compatibility with a base polymer.

A (meth)acryl-based polymer consisting essentially of alkylene glycol group-containing (meth)acrylate can be used as an alkylene glycol group-containing (meth)acryl-based polymer.

Examples of an oxyalkylene unit of a (meth)acrylate in the present invention include an alkylene group of a carbon number of 1 to 6 such as an oxymethylene group, an oxyethylene group, an oxypropylene group, and an oxybutylene group.

In addition, a mole number of addition of an oxyalkylene unit to (meth)acrylate is preferably 1 to 50, more preferably 2 to 30.

A terminal of an oxyalkylene chain may be a hydroxyl group or substituted with an alkyl group and a phenyl group.

Examples of alkylene glycol group-containing (meth) acrylate include a methoxy-polyethylene glycol(meth)acrylate type such as methoxy-diethylene glycol(meth)acrylate and methoxy-triethylene glycol(meth)acrylate, an ethoxy-polyethylene glycol(meth)acrylate type such as ethoxy-diethylene glycol(meth)acrylate and ethoxy-triethylene glycol (meth)acrylate, a butoxy-polyethylene glycol(meth)acrylate type such as butoxy-diethylene glycol(meth)acrylate and butoxy-triethylene glycol(meth)acrylate, a phenoxy-polyethylene glycol(meth)acrylate type such as phenoxy-diethylene glycol(meth)acrylate and phenoxy-triethylene glycol(meth) acrylate, a methoxy-polypropylene glycol(meth)acrylate type such as methoxy-dipropylene glycol(meth)acrylate, 2-ethylhexyl-polyethylene glycol(meth)acrylate, and nonyl phenol-polyethylene glycol(meth)acrylate.

In addition, acrylate and/or methacrylate having an alkyl group with a carbon number of 1 to 14 such as methyl(meth) acrylate, ethyl(meth)acrylate, n-butyl(meth)acrylate, s-butyl (meth)acrylate, t-butyl(meth)acrylate, isobutyl(meth)acrylate, hexyl(meth)acrylate, 2-ethylhexyl(meth)acrylate, n-octyl(meth)acrylate, isooctyl(meth)acrylate, n-nonyl (meth)acrylate, isononyl(meth)acrylate, n-decyl(meth)acrylate, isodecyl(meth)acrylate, n-dodecyl(meth)acrylate, n-tridecyl(meth)acrylate and n-tetradecyl(meth)acrylate can also be used to the above-mentioned components.

Furthermore, phosphoric group-containing (meth)acrylate, cyano group-containing (meth)acrylate, vinyl esters, aromatic vinyl compound, acid anhydride group-containing (meth)acrylate, hydroxyl group-containing (meth)acrylate, amide group-containing (meth)acrylate, amino group-containing (meth)acrylate, imide group-containing (meth)acrylate, epoxy group-containing (meth)acrylate, (meth)acryloylmorpholine, and vinyl ethers can properly be used.

Examples of the phosphoric group-containing monomer include 2-hydroxyethyl acryloyl phosphate.

Examples of the cyano group-containing monomer include acrylonitrile and methacrylonitrile.

Examples of the acid anhydride group-containing monomer include maleic acid anhydride, itaconic acid anhydride, and an acid anhydride of the aforementioned carboxyl group-containing monomer.

Examples of the hydroxyl group-containing monomer include 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol (meth)acrylamide, vinyl alcohol, allyl alcohol, 2-hydroxyethyl vinyl ether, 4-hydroxybutylvinyl ether, and diethylene glycol monovinyl ether.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the amido group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetoneacrylamide.

Examples of the amino group-containing monomer include aminoethyl(meth)acrylate, N,N-dimethylaminoethyl (meth)acrylate, and N,N-dimethylaminopropyl(meth)acrylate.

Examples of the imido group-containing monomer include cyclohexylmaleimide, isopropylmaleimide, N-cyclohexylmaleimide, and itaconeimide.

Examples of the epoxy group-containing monomer include glycidyl(meth)acrylate, methylglycidyl(meth)acrylate, and allyl glycidyl ether.

Examples of vinyl ethers include methyl vinyl ether, ethyl vinyl ether, and isobutyl vinyl ether.

The proportion of alkylene glycol group-containing (meth) acrylate contained in an alkylene glycol group-containing (meth)acrylate polymer is preferably 10 to 70% by weight. A proportion of alkylene glycol group-containing (meth)acrylate less than 10% by weight does not allow sufficient antistatic property, while a proportion thereof more than 70% by weight causes poor compatibility with a (meth)acryl-based polymer as a base polymer and thereby does not allow sufficient antistatic property.

In addition, the aformentioned (meth)acrylates may be used alone, or two or more kinds may be used by mixing.

Furthermore, an ether-type surfactant may be used as an ether group-containing compound in the present invention. Specific examples of an ether-type surfactant include ADEKA REASOAP NE-10, ADEKA REASOAP SE-10N, ADEKA REASOAP SE-20N, ADEKA REASOAP ER-10, ADEKA REASOAP SR-10, ADEKA REASOAP SR-20 (all of which are manufactured by Asahi Denka Co., Ltd.), EMULGEN 120 (manufactured by Kao Corporation) and NOIGEN EA130T (manufactured by Dai-Ichi Kogyo Seiyaku Co., Ltd.).

As a molecular weight of the aforementioned ether group-containing compound such as polyether polyol compound and ethylene oxide group-containing compound, a number average molecular weight of 10,000 or less, preferably 200 to 5,000 is preferably used. When a number average molecular weight exceeds 10,000, there is a tendency that stain property onto an adherend is deteriorated. A number average molecular weight refers to a molecular weight obtained by measurement by GPC (gel permeation chromatography).

The aforementioned ether group-containing compound may be used alone, or two or more of them may be used by mixing. An amount of the aforementioned ether group-containing compound to be blended is 0.01 to 20 parts by weight, preferably 0.1 to 10 parts by weight relative to 100 parts by weight of a (meth)acryl-based polymer. When the amount is less than 0.01 part by weight, sufficient antistatic property is not obtained and, when the amount exceeds 20 parts by weight, there is a tendency that staining on an adherend (a subject to be protected) is increased.

Furthermore, the previously known tackifiers, or the previously known various additives such as a colorant, a surfactant, an elasticizer, low molecular polymer, a surface lubricant agent, a leveling agent, an antioxidant, a corrosion preventing agent, a photo stabilizer, an ultraviolet absorbing agent, a polymerization inhibitor, a silane coupling agent, and a powder, a particle, inorganic or organic filer, metal powder, a foil, and pigment may be appropriately added to the pressure-sensitive adhesive composition used in the pressure-sensitive adhesive sheet of the present invention depending on utility.

Meanwhile, the pressure-sensitive adhesive layer in the present invention is such that the aforementioned pressure-sensitive adhesive composition is crosslinked. In addition, pressure-sensitive adhesive sheets of the present invention are such that such the pressure-sensitive adhesive layer is formed on a supporting film (a support). Thereupon, crosslinking of the pressure-sensitive adhesive composition is generally performed after coating of the pressure-sensitive adhesive composition, and a pressure-sensitive adhesive layer composition after crosslinking may be also transferred onto a supporting film.

When a photopolymerization initiator as an arbitrary component is added as described above, a pressure-sensitive adhesive layer can be obtained by coating the pressure-sensitive adhesive composition directly on a subject to be protected, or coating on one side or both sides of a supporting substrate, and performing light irradiation. Usually, a pressure-sensitive adhesive layer is used by photopolymerization by irradiating with ultraviolet ray having an irradiance of 1 to 200 mW/cm$^2$ at a wavelength of 300 to 400 nm, at an exposure dose of around 200 to 4000 mJ/cm$^2$.

A method of forming a pressure-sensitive adhesive layer on a film is not particularly limited, but for example, a layer is prepared by coating the aforementioned pressure-sensitive adhesive composition on a supporting film, and drying this to remove a polymerization solvent to form a pressure-sensitive adhesive layer on a supporting film. Thereafter, aging may be performed for the purpose of adjusting transference of a component of a pressure-sensitive adhesive layer or adjusting a crosslinking reaction. Alternatively, when pressure-sensitive adhesive sheets are prepared by coating a pressure-sensitive adhesive composition on a supporting film, one or more kinds of solvents other than a polymerization solvent may be newly added to the composition so that the composition can be uniformly coated on a supporting film.

In addition, as a method of forming the pressure-sensitive adhesive layer of the present invention, the known method used for preparing pressure-sensitive adhesive sheets is used. Specifically, examples include roll coating, gravure coating, reverse coating, roll brushing, spray coating, and air knife coating methods, immersing and curtain coating method, and extruding coating method with a die coater.

Pressure-sensitive adhesive sheets of the present invention are such that the aforementioned pressure-sensitive adhesive layer is coated on one side or both sides of various supports comprising a plastic film such as a polyester film, or a porous material such as a paper and a non-woven fabric at a thickness of usually 3 to 100 μm, preferably around 5 to 50 μm, to form an aspect of a sheet or a tape.

A thickness of the film of the present pressure-sensitive adhesive sheets is usually 5 to 200 μm, preferably around 10 to 100 μm.

The support film (support) may be subjected to releasing, anti-staining with silicone, fluorine, long chain alkyl-based or fatty acid amide-based releasing agent, or a silica powder, easy adhesion treatment such as acid treatment, alkali treatment, primer treatment, corona treatment, plasma treatment, and ultraviolet ray treatment, or coating-type, kneading-type, or deposition-type antistatic treatment, if necessary.

In addition, the support film (support) constituting a surface protecting film is preferably a resin film (plastic substrate) having heat resistance and solvent resistance and, at the same time, having flexibility. By the support film having flexibility, a pressure-sensitive adhesive composition can be coated by a roll coater etc., and can be wound in a roll-like.

The aforementioned plastic substrate is not particularly limited as far as it can be formed into a sheet or a film, and examples include a polyolefin film such as polyethylene, polypropylene, poly-1-butene, poly-4-methyl-1-pentene, a polybutadiene film, a polymethylpentene film, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon 6,6, and partially aromatic polyamide, a polyvinyl chloride film, a vinyl chloride copolymer film, a polyvinylidene chloride film, and a polycarbonate film.

In addition, in the present invention, it is more preferably that a plastic substrate used in the surface protecting film of the present invention is electrification preventing-treated.

Antistatic treatment which is performed on a plastic substrate is not particularly limited, but for example, a method of providing an electrification preventing layer on at least one side of a generally used film, or a method of kneading a kneading-type electrification preventing agent into a plastic film is used. Examples of a method of providing an electrification preventing layer on at least one side of a substrate include a method of coating an electrification preventing resin comprising an electrification preventing agent and a resin component, or an electrically conductive resin containing an electrically conductive polymer or an electrically conductive substance, and a method of depositing or plating an electrically conductive substance.

Examples of an electrification preventing agent contained in an electrification preventing resin include a cation-type electrification preventing agent having a cationic functional group such as a quaternary ammonium salt, a pyridinium salt, and a primary, secondary or tertiary amino group, an anion-type electrification preventing agent having an anionic functional group such as a sulfonic acid salt, a sulfuric acid ester salt, a phosphonic acid salt, and a phosphoric ester salt, an amphoteric-type electrification preventing agent such as alkylbetain and a derivative thereof, imidazoline and a derivative thereof, and alanine and a derivative thereof, a nonion-type electrification preventing agent such as glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or two or more of them may be used by mixing.

Specifically, examples of the cation-type electrification preventing agent include a (meth)acrylate copolymer having a quaternary ammonium group such as an alkyl trimethylammonium salt, acyloylamidopropyltrimethtylammonium methosulfate, an alkylbenzylmethylammonium salt, acyl choline chloride, and polydimethylaminoethyl methacrylate, a styrene copolymer having a quaternary ammonium group such as polyvinylbenzyltrimethylammonium chloride, and a diallylamine copolymer having a quaternary ammonium group such as polydiallyldimethylammonium chloride. The compounds may be used alone, or two or more kinds may be used by mixing.

Examples of the anion-type electrification preventing agent include an alkyl sulfonic acid salt, an alkylbenzenesulfonic acid salt, an alkyl sulfate ester salt, an alkyl ethoxy sulfate ester salt, an alkyl phosphate ester salt, and a sulfonic acid group-containing styrene copolymer. These compounds may be used alone, or two or more kinds may be used by mixing.

Examples of the amphoteric-type electrification preventing agent include alkylbetain, alkylimidazoliumbetain, and carbobetaingrafted copolymer. These compounds may be used alone, or two or more kinds may be used by mixing.

Examples of the nonion-type electrification preventing agent include fatty acid alkylolamide, di(2-hydroxyethyl) alkylamine, polyoxyethylenealkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylenediamine, a copolymer consisting of polyether, polyester and polyamide, and methoxypolyethyleneglycol (meth)acrylate. These compounds may be used alone, or two or more kinds may be used by mixing.

Examples of the electrically conductive polymer include polyaniline, polypyrrole and polythiophene. These electrically conductive polymers may be used alone, or two or more kinds may be used by mixing.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

As a resin component used in the electrification preventing resin and the electrically conductive resin, a generally used resin such as polyester, acryl, polyvinyl, urethane, melamine and epoxy is used. In the case of a polymer-type electrification preventing agent, it is not necessary that a resin component is contained. In addition, the electrification preventing resin component may contain compounds of a methylolated or alkylolated melamine series, a urea series, a glyoxal series, and an acrylamide series, an epoxy compound, or an isocyanate compound as a crosslinking agent.

An electrification preventing layer is formed, for example, by diluting the aforementioned electrification preventing resin, electrically conductive polymer or electrically conductive resin with a solvent such as an organic solvent and water, and coating this coating solution on a plastic film, followed by drying.

Examples of an organic solvent used in formation of the electrification preventing layer include methyl ethyl ketone, acetone, ethyl acetate, tetrahydrofuran, dioxane, cyclohexanone, n-hexane, toluene, xylene, methanol, ethanol, n-propanol and isopropanol. These solvents may be used alone, or two or more kinds may be used by mixing.

As a coating method in formation of the electrification preventing layer, the known coating method is appropriately used, and examples include roll coating, gravure coating, reverse coating, roll brushing, spray coating, and air knife coating methods, an immersing and curtain coating method, and an extrusion coating method with a die coater.

A thickness of the aforementioned electrification preventing resin layer, electrically conductive polymer or electrically conductive resin is usually 0.01 to 5 µm, preferably around 0.03 to 1 µm.

Examples of a method of depositing or plating an electrically conductive substance include vacuum deposition, sputtering, ion plating, chemical deposition, spray pyrolysis, chemical plating, and electric plating methods.

A thickness of the electrically conductive substance is usually 20 to 10,000 Å, preferably 50 to 5,0000 Å.

As the kneading-type electrification preventing agent, the aforementioned electrification preventing agent is appropriately used.

An amount of the kneading-type electrification preventing agent to be blended is 20% by weight or less, preferably in a range of 0.05 to 10% by weight relative to a total weight of a plastic film. A kneading method is not particularly limited as far as it is a method by which the electrification preventing agent can be uniformly mixed into a resin used in a plastic film, but for example, a heating roll, a Banbury mixer, a pressure kneader, and a biaxial kneading machine are used.

If necessary, a separator (or peeling liner, peeling sheet etc.) can be laminated on a surface of a pressure-sensitive adhesive for the purpose of protecting a pressure-sensitive adhesive surface.

The material constituting the separator includes paper and a plastic film, and the plastic film is preferably used because it is excellent in surface smoothness. The film is not particularly limited insofar as it can protect the pressure-sensitive adhesive layer, and examples thereof include a polyethylene film, polypropylene film, polybutene film, polybutadiene film, polymethyl pentene film, polyvinyl chloride film, vinyl chloride copolymer film, polyethylene terephthalate film, polybutylene terephthalate film, polyurethane film, and ethylene/vinyl acetate copolymer film.

A thickness of the separator (separator film) is usually around 5 to 200 µm, preferably around 10 to 100 µm.

The separator (separator film) may be subjected to releasing, anti-staining with silicone, fluorine, long chain alkyl-based or fatty acid amide-based releasing agent, or a silica powder, or coating-type, kneading-type, or deposition-type antistatic treatment, if necessary.

The pressure-sensitive adhesive composition, the pressure-sensitive adhesive layer, and the pressure-sensitive adhesive sheets and surface protecting films using the present invention are used, particularly, in plastic products on which static electricity is easily generated. For this reason, in particular, those films are very useful as an antistatic surface protecting film in the technical field associated with an electron appliances in which electrification of static electricity and staining are a particularly serious problem.

EXAMPLES

Examples which specifically show a construction and effect of the present invention will be explained below. Assessment items in Examples were measured as follows:

<Measurement of Acid Value>

An acid value was measured using an automatically titrating apparatus (COM-550 manufactured by HIRANUMA SANGYO Co., Ltd.), and was obtained by the following equation.

$$A=\{(Y-X) \times f \times 5.611\}/M$$

A; Acid value
Y; Titration amount of sample solution (ml)
X; Titration amount of solution of only 50 g of mixed solvent (ml)
f; Factor of titration solution
M; Weight of polymer sample (g)
Measurement conditions are as follows:
Sample solution: About 0.5 g of a polymer sample was dissolved in 50 g of a mixed solvent (toluene/2-propanol/distilled water=50/49.5/0.5, weight ratio) to obtain a sample solution.
Titration solution: 0.1N 2-propanolic potassium hydroxide solution (for petroleum product neutralization value test manufactured by Wako Pure Chemical Industries, Ltd.)
Electrode: glass electrode; GE-101, comparative electrode; RE-201, Measurement mode: petroleum product neutralization value test 1

<Measurement of Molecular Weight>

A molecular weight was measured using a GPC apparatus (HLC-8220GPC manufactured by Tosoh Corporation). Measuring conditions are as follows.
Sample concentration: 0.2 wt % (THF solution)
Sample injection amount: 10 μl
Eluent: THF
Flow rate: 0.6 ml/min
Measuring temperature: 40° C.
Column:
Sample column; TSKguard column SuperHZ-H(1 column)+TSK gel Super HZM-H(2 columns)
Reference column; TSK gel SuperH-RC(1 column)
Detector: Refractive index detector (RI)
A molecular weight was obtained in terms of polystyrene.

<Measurement of Glass Transition Temperature Tg>

A glass transition temperature Tg(° C.) was obtained by the following equation using the following reference values as a glass transition temperature $Tg_n$(° C.) of a homopolymer of each monomer.
Equation:

$$1/(Tg+273)=\Sigma[W_n/(Tg_n+273)]$$

[wherein Tg (° C.) represents a glass transition temperature of a copolymer, $W_n$ (−) represents a weight fraction of each monomer, $Tg_n$ (° C.) represents a glass transition temperature of a homopolymer of each monomer, and n represents a kind of each monomer]
Reference Values:
2-Ethylhexyl acrylate: −70° C.
2-Hydroxyethyl acrylate: −15° C.
Ethoxy-diethilene glycol acrylate: −70° C.
Acrylic acid: 106° C.

<Measurement of Glass Transition Temperature Tg of Acryl-Based Polymer (F); Measurement of a Dynamic Viscoelasticity>

The glass transition temperature (Tg) (° C.) of the Acryl-based polymer (F) whose reference value was unknown was determined based on the measurement of a dynamic viscoelasticity that is described in Example.
Sheets of an acryl-based polymer having a thickness of 25 μm were laminated into a thickness of about 2 mm, this was punched into φ7.9 mm to prepare a cylindrical pellet, and this was used as a sample for measuring a glass transition temperature (Tg).
Using the measuring sample, the measuring sample was fixed on a jig of a φ7.9 mm parallel plate, temperature dependency of loss elastic modulus G" was measured with a dynamic viscoelasticity measuring apparatus (ARES manufactured by Rheometric Scientific, Inc.), and a temperature at which the resulting G" curve became a maximum was adopted as a glass transition temperature (Tg) (° C.). Measuring conditions are as follows.
Measurement: shear mode
Temperature range: −70° C. to 150° C.
Temperature raising rate: 5° C./min Frequency: 1 Hz <Preparation of (meth)acryl-Based Polymer>

[Acryl-Based Polymer (A)]

A four-neck flask equipped with a stirring wing, a thermometer, a nitrogen gas introducing tube, a condenser, and an addition funnel was charged with 180 parts by weight of 2-ethylhexyl acrylate, 20 parts by weight of ethoxy-diethylene glycol acrylate, 8 parts by weight of 2-hydroxyethyl acrylate, 0.4 part by weight of 2,2'-azobisisobutyronitrile as a polymerization initiator, 47 parts by weight of toluene, and 265 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (A) solution (40% by weight). A weight average molecular weight of the acryl-based copolymer (A) was 500,000, a glass transition temperature (Tg) was −68° C., and an acid value was 0.

[Acryl-Based Polymer (B)]

A four-neck flask equipped with a stirring wing, a thermometer, a nitrogen gas introducing tube, a condenser, and an addition funnel was charged with 140 parts by weight of 2-ethylhexyl acrylate, 60 parts by weight of ethoxy-diethylene glycol acrylate, 8 parts by weight of 2-hydroxyethyl acrylate, 0.4 part by weight of 2,2'-azobisisobutyronitrile as a polymerization initiator, 94 parts by weight of toluene, and 218 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (B) solution (40% by weight). A weight average molecular weight of the acryl-based copolymer (B) was 500,000, a glass transition temperature (Tg) was −68° C., and an acid value was 0.

[Acryl-Based Polymer (C)]

A four-neck flask equipped with a stirring wing, a thermometer, a nitrogen gas introducing tube, a condenser, and an addition funnel was charged with 200 parts by weight of ethoxy-diethylene glycol acrylate, 8 parts by weight of 2-hydroxyethyl acrylate, 0.4 part by weight of 2,2'-azobisisobutyronitrile as a polymerization initiator, 193 parts by weight of toluene, and 193 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (C) solution (40% by weight). A weight average molecular weight of the acryl-based copolymer (C) was 440,000, a glass transition temperature (Tg) was −68° C., and an acid value was 0.

[Acryl-Based Polymer (D)]

A four-neck flask equipped with a stirring wing, a thermometer, a nitrogen gas introducing tube, a condenser, and an addition funnel was charged with 200 parts by weight of 2-ethylhexyl acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (D) solution (40% by weight). A weight average molecular weight of the acryl-based copolymer (D) was 540,000, a glass transition temperature (Tg) was −68° C., and an acid value was 0.

[Acryl-Based Polymer (E)]

A four-neck flask equipped with a stirring wing, a thermometer, a nitrogen gas introducing tube, a condenser, and an addition funnel was charged with 140 parts by weight of 2-ethylhexyl acrylate, 60 parts by weight of ethoxy-diethylene glycol acrylate, 4 parts by weight of acrylic acid, 0.4 part by weight of 2,2'-azobisisobutyronitrile as a polymerization initiator, 47 parts by weight of toluene, and 265 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (E) solution (40% by weight). A weight average molecular weight of the acryl-based copolymer (E) was 720,000, a glass transition temperature (Tg) was −68° C., and an acid value was 15.

[Acryl-Based Polymer (F)]

A four-neck flask equipped with a stirring wing, a thermometer, a nitrogen gas introducing tube, a condenser, and an addition funnel was charged with 190 parts by weight of 2-ethylhexyl acrylate, 10 parts by weight of ethoxy-diethylene glycol acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (F) solution (40% by weight). A weight average molecular weight of the acryl-based copolymer (F) was 670,000, a glass transition temperature (Tg) was −68° C., and an acid value was 0.

[Acryl-Based Polymer (G)]

A four-neck flask equipped with a stirring wing, a thermometer, a nitrogen gas introducing tube, a condenser, and an addition funnel was charged with 180 parts by weight of 2-ethylhexyl acrylate, 20 parts by weight of methoxy-dipropylene glycol acrylate, 8 parts by weight of 2-hydroxyethyl acrylate, 0.4 part by weight of 2,2'-azobisisobutyronitrile as a polymerization initiator, and 386 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (G) solution (35% by weight). A weight average molecular weight of the acryl-based copolymer (G) was 410,000, a glass transition temperature (Tg) was lower than 0° C., and an acid value was 0.

<Preparation of Antistatic Agent>

[Antistatic Agent Solution (a)]

A four-neck flask equipped with a stirring wing, a thermometer, a condenser, and an addition funnel was charged with 5 parts by weight of lithium iodide, and 20 parts by weight of ethyl acetate, and mixing and stirring were performed for about 2 hours while maintaining a liquid temperature in a flask at around 25° C., to prepare an antistatic agent solution (a) (20% by weight).

[Antistatic Agent Solution (b)]

A four-neck flask equipped with a stirring wing, a thermometer, a condenser, and an addition funnel was charged with 5 parts by weight of $Li(C_2F_5SO_2)_2N$, 20 parts by weight of ethyl acetate, a nitrogen gas was introduced while mildly stirring, and mixing and stirring were performed for about 2 hours while maintaining a liquid temperature in a flask at around 25° C., to prepare an antistatic agent solution (b) (20% by weight).

[Antistatic Agent Solution (c)]

A four-neck flask equipped with a stirring wing, a thermometer, a condenser, and an addition funnel was charged with 0.1 part by weight of lithium iodide, 7.9 parts by weight of polypropylene glycol (diol type, number average molecular weight 2000), and 8 parts by weight of ethyl acetate, and mixing and stirring were performed for about 2 hours while maintaining a liquid temperature in a flask at around 80° C., to prepare an antistatic agent solution (c) (50% by weight).

[Antistatic Agent Solution (d)]

A four-neck flask equipped with a stirring wing, a thermometer, a condenser, and an addition funnel was charged with 0.1 part by weight of lithium iodide, 9.9 parts by weight of a polyethylene glycol/polypropylene glycol/polyethylene glycol block copolymer (epane 450 manufactured by Dai-Ichi Kogyo Seiyaku Co., Ltd., number average molecular weight 2400, ethylene oxide group content: 50% by weight), and 10 parts by weight of ethyl acetate, and mixing and stirring were performed for about 2 hours while maintaining a liquid temperature in a flask at around 80° C., to prepare an antistatic agent solution (d) (50% by weight).

<Preparation of Antistatic-Treated Polyethylene Terephthalate Film>

10 parts by weight of an antistatic agent (Microsolver RMd-142 manufactured by SOLVEX CO., LTD., main component: tin oxide and polyester resin) was diluted with a mixed solvent consisting of 30 parts by weight of water and 70 parts by weight of methanol to prepare an antistatic agent solution.

The resulting antistatic agent solution was coated on a polyethylene terephthalate (PET) film (thickness 38 μm) using a Meyer-bar, and this was dried at 130° C. for 1 minute to remove a solvent to form an antistatic layer (thickness 0.2 μm), thereby, an antistatic-treated polyethylene terephthalate film was prepared.

Example 1

Preparation of Pressure-Sensitive Adhesive Solution

The acryl-based polymer (A) solution (40% by weight) was diluted with ethyl acetate to 20% by weight, to 100 parts by weight of this solution were added 0.4 part by weight of the antistatic agent solution (a) (20% by weight), 1.1 parts by weight of a trimethylolpropane/tolylene diisocyanate trimer adduct (Coronate L manufactured by Nippon Polyurethane Industry Co., Ltd., 75% by weight ethyl acetate solution) as a crosslinking agent, and 0.6 part by weight of dibutyltin dilaurate (1% by weight ethyl acetate solution) as a crosslinking catalyst, and mixing and stirring were performed to prepare an acryl-based pressure-sensitive adhesive solution (1).

Preparation of Pressure-Sensitive Adhesive Sheet

The acryl-based pressure-sensitive adhesive solution (1) was coated on a side opposite to an antistatic-treated side of the antistatic-treated polyethylene terephthalate film prepared as described above, and this was heated at 110° C. for 3 minutes to form a pressure-sensitive adhesive layer having a thickness of 20 μm. Then, a silicone-treated side of a polyethylene terephthalate film (thickness 25 μm) having a silicone-treated one side was laminated on a surface of the pressure-sensitive adhesive layer to prepare a pressure-sensitive adhesive sheet.

Example 2

Preparation of Pressure-Sensitive Adhesive Solution

According to the same manner as that of Example 1 except that the acryl-based copolymer (B) solution was used in place of the acryl-based copolymer (A) solution, an acryl-based pressure-sensitive adhesive solution (2) was prepared.

Preparation of Pressure-Sensitive Adhesive Sheet

According to the same manner as that of Example 1 except that the acryl-based pressure-sensitive adhesive solution (2) was used in place of the acryl-based pressure-sensitive adhesive solution (1), a pressure-sensitive adhesive sheet was prepared.

Example 3

Preparation of Pressure-Sensitive Adhesive Solution

The acryl-based polymer (C) solution (40% by weight) was diluted with ethyl acetate to 20% by weight, to 100 parts by weight of this solution were added 0.7 part by weight of the antistatic agent solution (a) (20% by weight), 0.5 part by weight of an isocyanurate of hexamethylene diisocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed to prepare an acryl-based pressure-sensitive adhesive solution (3).

Preparation of Pressure-Sensitive Adhesive Sheet

According to the same manner as that of Example 1 except that the acryl-based pressure-sensitive adhesive solution (3) was used in place of the acryl-based pressure-sensitive adhesive solution (1), a pressure-sensitive adhesive sheet was prepared.

Example 4

Preparation of Pressure-Sensitive Adhesive Solution

According to the same manner as that of Example 3 except that 0.7 part by weight of the antistatic agent solution (b) (20% by weight) was used in place of 0.7 part by weight of the antistatic agent solution (a) (20% by weight), an acryl-based pressure-sensitive adhesive solution (4) was prepared.

Preparation of Pressure-Sensitive Adhesive Sheet

According to the same manner as that of Example 1 except that the acryl-based pressure-sensitive adhesive solution (4) was used in place of the acryl-based pressure-sensitive adhesive solution (1), a pressure-sensitive adhesive sheet was prepared.

Comparative Example 1

Preparation of Pressure-Sensitive Adhesive Solution

The acryl-based polymer (D) solution (40% by weight) was diluted with ethyl acetate to 20% by weight, to 100 parts by weight of this solution were added 2.0 parts by weight of an anionic surfactant, a sodium salt of dialkyl sulfo succinate (NEOCOL P manufactured by DAI-ICHI kogyo seiyaku CO., Ltd.), 1.1 parts by weight of a trimethylolpropane/tolylene diisocyanate trimer adduct (Coronate L manufactured by Nippon Polyurethane Industry Co., Ltd., 75% by weight ethyl acetate solution) as a crosslinking agent, and 0.6 part by weight of dibutyltin dilaurate (1% by weight ethyl acetate solution) as a crosslinking catalyst, and mixing and stirring were performed to prepare an acryl-based pressure-sensitive adhesive solution (5).

Preparation of Pressure-Sensitive Adhesive Sheet

According to the same manner as that of Example 1 except that the acryl-based pressure-sensitive adhesive solution (5) was used in place of the acryl-based pressure-sensitive adhesive solution (1), a pressure-sensitive adhesive sheet was prepared.

Comparative Example 2

Preparation of Pressure-Sensitive Adhesive Solution

The acryl-based polymer (D) solution (40% by weight) was diluted with ethyl acetate to 20% by weight, to 100 parts by weight of this solution were added 3.2 parts by weight of the antistatic agent solution (c) (50% by weight), 0.4 part by weight of an isocyanurate of hexamethylene diisocyanate (Coronate HX manufactured by Nippon Polyurethane Industry Co., Ltd., 100% by weight) as a crosslinking agent, and 0.4 parts by weight of dibutyltin dilaurate (1% by weight ethyl acetate solution) as a crosslinking catalyst, and mixing and stirring were performed to prepare an acryl-based pressure-sensitive adhesive solution (6).

Preparation of Pressure-Sensitive Adhesive Sheet

According to the same manner as that of Example 1 except that the acryl-based pressure-sensitive adhesive solution (6) was used in place of the acryl-based pressure-sensitive adhesive solution (1), a pressure-sensitive adhesive sheet was prepared.

Comparative Example 3

Preparation of Pressure-Sensitive Adhesive Solution

An acryl-based pressure-sensitive adhesive solution (7) was prepared in the same manner as in Example 1, except that the aforementioned antistatic agent solution (a) was not used.

Preparation of Pressure-Sensitive Adhesive Sheet

According to the same manner as that of Example 1 except that the acryl-based pressure-sensitive adhesive solution (7)

was used in place of the acryl-based pressure-sensitive adhesive solution (1), a pressure-sensitive adhesive sheet was prepared.

Comparative Example 4

Preparation of Pressure-Sensitive Adhesive Solution

The acryl-based polymer (E) solution (40% by weight) was diluted with ethyl acetate to 20% by weight, to 100 parts by weight of this solution were added 0.7 part by weight of the antistatic agent solution (a) (20% by weight), and 0.7 part by weight of 1,3-bis(N,N-diglycidyl aminomethyl)cyclohexane (TETRAD C manufactured by Mitsubishi Gas Chemical Company, Inc.) as a crosslinking agent, and mixing and stirring were performed to prepare an acryl-based pressure-sensitive adhesive solution (8).

Preparation of Pressure-Sensitive Adhesive Sheet

According to the same manner as that of Example 1 except that the acryl-based pressure-sensitive adhesive solution (8) was used in place of the acryl-based pressure-sensitive adhesive solution (1), a pressure-sensitive adhesive sheet was prepared.

Example 5

Preparation of Pressure-Sensitive Adhesive Solution

The acryl-based polymer (F) solution (40% by weight) was diluted with ethyl acetate to 20% by weight, to 100 parts by weight of this solution were added 2.8 parts by weight of the antistatic agent solution (d) (50% by weight), 0.3 part by weight of an isocyanurate of hexamethylene diisocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed for 1 minute under 25° C. to prepare an acryl-based pressure-sensitive adhesive solution (9).

Preparation of Pressure-Sensitive Adhesive Sheet

According to the same manner as that of Example 1 except that the acryl-based pressure-sensitive adhesive solution (9) was used in place of the acryl-based pressure-sensitive adhesive solution (1), a pressure-sensitive adhesive sheet was prepared.

Example 6

Preparation of Pressure-Sensitive Adhesive Solution

The acryl-based polymer (G) solution (35% by weight) was diluted with ethyl acetate to 20% by weight, to 100 parts by weight of this solution were added 4 parts by weight of the antistatic agent solution (d) (50% by weight), 0.4 part by weight of an isocyanurate of hexamethylene diisocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed for 1 minute under 25° C. to prepare an acryl-based pressure-sensitive adhesive solution (10).

Preparation of Pressure-Sensitive Adhesive Sheet

According to the same manner as that of Example 1 except that the acryl-based pressure-sensitive adhesive solution (10) was used in place of the acryl-based pressure-sensitive adhesive solution (1), a pressure-sensitive adhesive sheet was prepared.

Comparative Example 5

Preparation of Pressure-Sensitive Adhesive Solution

The acryl-based polymer (D) solution (40% by weight) was diluted with ethyl acetate to 20% by weight, to 100 parts by weight of this solution were added 2.8 parts by weight of the antistatic agent solution (d) (50% by weight), 0.4 part by weight of an isocyanurate of hexamethylene diisocyanate (Coronate HX manufactured by Nippon Polyurethane Industry Co., Ltd., 100% by weight) as a crosslinking agent, and 0.4 part by weight of dibutyltin dilaurate (1% by weight ethyl acetate solution) as a crosslinking catalyst, and mixing and stirring were performed for 1 minute under 250° C. to prepare an acryl-based pressure-sensitive adhesive solution (11).

Preparation of Pressure-Sensitive Adhesive Sheet

According to the same manner as that of Example 1 except that the acryl-based pressure-sensitive adhesive solution (11) was used in place of the acryl-based pressure-sensitive adhesive solution (1), a pressure-sensitive adhesive sheet was prepared.

Regarding pressure-sensitive adhesive sheets obtained in the aforementioned Examples and comparative Examples, a peeling electrification voltage, assessment of staining property (staining), and an adhesive strength were assessed by the following conditions.

<Measurement of Peeling Electrification Voltage>

A pressure-sensitive adhesive sheet was cut into a size of a width of 70 mm and a length of 130 mm, a separator was peeled, and this was adhered to a surface of a polarizing plate (SEG1425EWVAGS2B manufactured by Nitto Denko Corporation, width: 70 mm, length: 100 mm) laminated to an acryl plate (Acrylite manufactured by Mitsubishi Rayon Co., Ltd, thickness: 1 mm, width: 70 mm, length: 100 mm) from which electricity had been removed in advance, with a hand roller, so that one end was protruded by 30 mm.

After allowed to stand for one day under the environment of 23° C.×50% RH, and a sample was set at a prescribed position as shown in FIG. 1. One end protruding by 30 mm was fixed on an automatic winding machine, and a sample was peeled at a peeling angle of 150° and a peeling rate of 10 m/min. A voltage at a polarizing plate surface generated thereupon was measured with an electrostatic voltmeter (KSD-0103 manufactured by Kasuga Denki, INC.) fixed at the center position of the polarizing plate. Measurement was performed under the environment of 23° C.×50% RH.

<Assessment of Staining on an Adherend (a Subject to be Protected)>

A triacetylcellulose film (FujiTAC manufactured by Fuji Photo Film Co., Ltd.) having a thickness of 90 μm was cut into a size of a width of 70 mm and a length of 100 mm, and this was immersed in an aqueous sodium hydroxide solution (10% by weight) at 60° C. for 1 minute, and washed with distilled water to prepare an adherend.

The prepared pressure-sensitive adhesive sheet was cut into a size of a width of 50 mm and a length of 80 mm, and after the separator was peeled off, the pressure-sensitive adhesive sheet was laminated at a pressure of 0.25 MPa on the aforementioned adherend (previously washed with distilled water and left for one day in an environment of 23° C.×50% RH) to prepare an evaluation sample.

The evaluation sample was left for one day under the environment of 23° C.×50% RH, and the pressure-sensitive adhesive sheet was peeled off from the adherend by hands, and the state of staining on the surface of the adherend was observed with naked eyes. The evaluation criteria are as follows.

Case of observation of no staining: ○
Case of observation of staining: x

<Measurement of an Adhesive Strength of Pressure-Sensitive Adhesive Sheet>

A triacetylcellulose film (Fuji TAC manufactured by Fuji Photo Film Co., Ltd.) having a thickness of 90 μm was cut into a size of a width of 70 mm and a length of 100 mm, and this was immersed in an aqueous sodium hydroxide solution (10% by weight) at 60° C. for 1 minute, and washed with distilled water to prepare an adherend.

The adherend was allowed to stand for 24 hours under the environment of 23° C.×50% RH, to obtain an adherend for assessing an adhesive strength. And then, a pressure-sensitive adhesive sheet which had been cut into a size of a width of 25 mm and a length of 100 mm was laminated on the aforementioned adherend for assessment at a pressure of 0.25 MPa to prepare an assessment sample.

After allowed to stand for 30 minutes under the environment of 23° C.×50% RH after lamination, an adhesive strength when peeled at a peeling rate of 10 m/min and a peeling angle of 180° using a tensile tester was measured. Measurement was performed under the environment of 23° C.×50% RH.

The above results are shown in Table 1.

TABLE 1

|  | peeling electrification voltage [kV] | staining property [-] | adhesive strength [N/25 mm] |
|---|---|---|---|
| Example 1 | 0.0 | ○ | 1.3 |
| Example 2 | −0.2 | ○ | 1.1 |
| Example 3 | −0.7 | ○ | 0.5 |
| Example 4 | −0.6 | ○ | 0.5 |
| Example 5 | 0.0 | ○ | 0.9 |
| Example 6 | −0.3 | ○ | 1.0 |
| Comparative Example 1 | 0.0 | x | 0.4 |
| Comparative Example 2 | 0.0 | x | 0.3 |
| Comparative Example 3 | −1.5 | ○ | 1.6 |
| Comparative Example 4 | −1.4 | ○ | 0.6 |
| Comparative Example 5 | −0.2 | x | 0.8 |

Through the results of the above-mentioned Table 1, in the case (Examples 1 to 6) of using a pressure-sensitive adhesive composition containing as a base polymer an acryl-based polymer having a (meth)acrylic acid alkylene oxide adduct prepared by the present invention, it was clarified that the absolute value of peeling electrification voltage of the polarizing plate was suppressed to a low value of 1.0 kV or less, and staining of the polarizing plate as an adherend did not occur in any Examples.

On the contrary, in the case (Comparative Examples 1, 2, and 5) of not containing a (meth)acrylic acid alkylene oxide adduct, the occurrence of staining on a polarizing plate was confirmed though peeling electrification voltage was restrained to a low value. In the case (Comparative Example 3) of containing a (meth)acrylic acid alkylene oxide adduct and no alkali metal salt, and the case (Comparative Example 4) of using a (meth)acryl-based polymer having an acid value of more than 10, the absolute value of peeling electrification voltage was as a high value as −1.0 kV or more though staining on a polarizing plate was not confirmed. Accordingly, it was revealed that any pressure-sensitive adhesive compositions in the Comparative Examples cannot satisfy suppression of peeling electrification voltage and suppression of staining of the polarizing plate simultaneously, and are not suitable as those for antistatic pressure-sensitive adhesive sheets.

In addition, in pressure-sensitive adhesive sheets of Examples 1 to 6 of the present invention, a 180° peeling adhesive strength at a peeling rate of 10 m/min is in a range of 0.1 to 6 N/25 mm, and it is seen that the sheet is a pressure-sensitive adhesive sheet which can be applied as a re-peeling type surface protecting film.

Accordingly, it could be confirmed that the pressure-sensitive adhesive composition of the present invention is a pressure-sensitive adhesive composition excellent in antistatic properties upon peeling and in adhesion reliance with a reduction in staining of an adherend.

What is claimed is:

1. A pressure-sensitive adhesive composition, which comprises a (meth)acryl-based polymer containing, as a monomer component, 5 to 100% by weight of a (meth)acrylic acid alkylene oxide adduct, 0 to 95% by weight of a (meth)acryl-based monomer having an alkyl group of a carbon number of 1 to 14 other than the adduct, and 0 to 95% by weight of other polymerizable monomer, and an alkali metal salt, wherein an acid value of the (meth)acryl-based polymer is 6 or lower, and further comprising 1.5-15 parts by weight of a crosslinking agent relative to 100 parts by weight of the (meth)acryl-based polymer, wherein the crosslinking agent is selected from the group consisting of an isocyanate compound, an epoxy compound, a melamine-based resin, a metal chelate compound, and a combination thereof.

2. The pressure-sensitive adhesive composition according to claim 1, wherein the alkali metal salt is a lithium salt.

3. A pressure-sensitive adhesive layer, which is formed by crosslinking a pressure-sensitive adhesive composition as defined in claim 1.

4. A pressure-sensitive adhesive sheet comprising a pressure-sensitive adhesive layer, which is formed by crosslinking a pressure-sensitive adhesive composition as defined in claim 1 on one side or both sides of a support.

5. A surface protecting film comprising a pressure-sensitive adhesive layer, which is formed by crosslinking a pressure-sensitive adhesive composition as defined in claim 1 on one side or both sides of a support.

6. A pressure-sensitive adhesive layer, which is formed by crosslinking a pressure-sensitive adhesive composition as defined in claim 2.

7. A pressure-sensitive adhesive sheet comprising a pressure-sensitive adhesive layer, which is formed by crosslinking a pressure-sensitive adhesive composition as defined in claim 2 on one side or both sides of a support.

8. A surface protecting film comprising a pressure-sensitive adhesive layer, which is formed by crosslinking a pressure-sensitive adhesive composition as defined in claim 2 on one side or both sides of a support.

9. The pressure-sensitive adhesive composition according to claim 1, wherein the other polymerizable monomer is (meth)acrylate having a hydroxyl group, and wherein the other polymerizable monomer is present an amount of 10 to 93 parts by weight relative to 100 parts acryl-based polymer.

10. The pressure-sensitive adhesive composition according to claim 1, wherein the (meth)acryl-based polymer forms a solution when mixed with a solvent.

11. The pressure-sensitive adhesive composition according to claim 1, wherein the alkali metal salt is blended in an amount of 0.01 to 0.7 parts by weight relative to 100 parts by weight of the (meth)acryl-based polymer.

12. The pressure-sensitive adhesive composition according to claim 1, wherein the pressure-sensitive adhesive composition has an absolute value of peeling electrification voltage of 1.0 kV or less.

13. A pressure-sensitive adhesive composition having excellent antistatic property and low staining property, comprising:
   a (meth)acryl-based polymer containing, as a monomer component, 5 to 100% by weight of a (meth)acrylic acid alkylene oxide adduct, 0 to 95% by weight of a (meth)acryl-based monomer having an alkyl group of a carbon number of 1 to 14 other than the adduct, and 0 to 95% by weight of other polymerizable monomer, said (meth)acryl-based polymer having an acid value of 6 or lower; and
   an alkali metal salt,
   further comprising 1.5-15 parts by weight of a crosslinking agent relative to 100 parts by weight of the (meth)acryl-based polymer, wherein the crosslinking agent is selected from the group consisting of an isocyanate compound, an epoxy compound, a melamine-based resin, a metal chelate compound, and a combination thereof.

14. The pressure-sensitive adhesive composition according to claim 13, wherein the (meth)acrylic acid alkylene oxide adduct is selected from the group consisting of methoxy-polyethylene glycol (meth)acrylate, ethoxy-polyethylene glycol (meth)acrylate, butoxy-polyethylene glycol (meth)acrylate, phenoxy-polyethylene glycol (meth)acrylate, and methoxy-polypropylene glycol (meth)acrylate.

15. The pressure-sensitive adhesive composition according to claim 13, wherein the (meth)acryl-based monomer is (meth)acrylate selected from the group consisting of methyl (meth)acrylate, ethyl (meth)acrylate, n-butyl (meth)acrylate, s-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate.

16. The pressure-sensitive adhesive composition according to claim 13, wherein the other polymerizable monomer is (meth)acrylate having a hydroxyl group, and wherein the other polymerizable monomer is present an amount of 10 to 93 parts by weight relative to 100 parts acryl-based polymer.

17. The pressure-sensitive adhesive composition according to claim 13, wherein the acid value of the (meth)acryl-based polymer is adjusted by an amount of (meth)acrylate having an acid functional group to be blended.

18. The pressure-sensitive adhesive composition according to claim 13, wherein the (meth)acryl-based polymer has a weight average molecular weight of 100,000 to 5,000,000.

19. The pressure-sensitive adhesive composition according to claim 13, wherein the (meth)acryl-based polymer has a glass transition temperature (Tg) of 0° C. or lower.

20. The pressure-sensitive adhesive composition according to claim 13, wherein the alkali metal salt is a metal salt comprising lithium, sodium, or potassium.

21. The pressure-sensitive adhesive composition according to claim 13, wherein the alkali metal salt is blended in an amount of 0.01 to 5 parts by weight relative to 100 parts by weight of the (meth)acryl-based polymer.

22. The pressure-sensitive adhesive composition according to claim 13, wherein the (meth)acryl-based polymer contains, as a monomer component, 7 to 90% by weight of the (meth)acrylic acid alkylene oxide adduct and 10 to 93% by weight of the other (meth)acryl-based monomer.

23. A pressure-sensitive adhesive layer, which is formed by crosslinking a pressure-sensitive adhesive composition as defined in claim 13.

24. A pressure-sensitive adhesive sheet comprising a pressure-sensitive adhesive layer, which is formed by crosslinking the pressure-sensitive adhesive composition as defined in claim 13 on one side or both sides of a support.

25. The pressure-sensitive adhesive composition according to claim 1, wherein the alkali metal salt is blended in an amount of 0.01 to 5 parts by weight relative to 100 parts acryl-based polymer.

26. The pressure-sensitive adhesive composition according to claim 1, wherein the (meth)acryl-based polymer contains, as a monomer component, 9 to 80% by weight of the (meth)acrylic acid alkylene oxide adduct.

27. The pressure-sensitive adhesive composition according to claim 13, wherein the (meth)acryl-based polymer contains, as a monomer component, 9 to 80% by weight of the (meth)acrylic acid alkylene oxide adduct.

* * * * *